United States Patent
Radermacher

(10) Patent No.: US 9,445,465 B2
(45) Date of Patent: Sep. 13, 2016

(54) ADAPTATION CIRCUIT FOR COUPLING LED TO BALLAST

(71) Applicant: KONINKLIJKE PHILIPS N.V., Eindhoven (NL)

(72) Inventor: Harald Josef Gunther Radermacher, Aachen (DE)

(73) Assignee: KONINKLIKE PHILIPS N.V., Eindhoven (NL)

( * ) Notice: Subject to any disclaimer, the term of this patent is extended or adjusted under 35 U.S.C. 154(b) by 81 days.

(21) Appl. No.: 14/387,260

(22) PCT Filed: Mar. 20, 2013

(86) PCT No.: PCT/IB2013/052189
§ 371 (c)(1),
(2) Date: Sep. 23, 2014

(87) PCT Pub. No.: WO2013/144775
PCT Pub. Date: Oct. 3, 2013

(65) Prior Publication Data
US 2015/0054416 A1 Feb. 26, 2015

Related U.S. Application Data

(60) Provisional application No. 61/617,108, filed on Mar. 29, 2012.

(51) Int. Cl.
H05B 33/08 (2006.01)

(52) U.S. Cl.
CPC ...... *H05B 33/0815* (2013.01); *H05B 33/0806* (2013.01); *H05B 33/0845* (2013.01); *Y02B 20/383* (2013.01)

(58) Field of Classification Search
None
See application file for complete search history.

(56) References Cited

U.S. PATENT DOCUMENTS 5,729,098 A 3/1998 Konopka et al.
5,742,133 A 4/1998 Wilhelm et al.
(Continued)

FOREIGN PATENT DOCUMENTS

| JP | 1217494 A | 8/1989 |
| JP | 2000259993 A | 9/2000 |
| JP | 2001351402 A | 12/2001 |

OTHER PUBLICATIONS

"A Driving Technology for Retrofit LED Lamp for Fluorescent Lighting Fixtures with Electronic Ballasts" Chen et al, IEEE, 2010, p. 441-448.

*Primary Examiner* — Douglas W Owens
*Assistant Examiner* — James H Cho

(57) ABSTRACT

Adaptation circuits (1) allow discharge lamps to be replaced by light circuits (45) with light emitting diodes, while keeping ballast circuits (8) designed for connection to the discharge lamps. The adaptation circuits (1) comprise conversion circuits (2) for converting input voltage and current signals coming from the ballast circuits (8) into output voltage and current signals destined for the light circuits (45). The conversion circuits (2) reduce amplitudes of the input voltage signals to values below predefined values during predefined time intervals after energy from the ballast circuits (8) has been transferred to the conversion circuits (2). The time intervals are synchronized with periods of the input voltage signals. Between first draining states for draining energy and second releasing states for releasing the energy, third states such as holding states for holding the energy have been introduced. The third states allow relevant values as experienced by the ballast circuits (8) to remain comparable to situations when the discharge lamps were powered.

18 Claims, 4 Drawing Sheets

(56) References Cited

U.S. PATENT DOCUMENTS

| | | |
|---|---|---|
| 6,388,393 B1 | 5/2002 | Illingworth |
| 7,852,017 B1 | 12/2010 | Melanson |
| 8,664,880 B2 * | 3/2014 | Ivey .................. H05B 33/0803 315/224 |
| 2002/0060526 A1 | 5/2002 | Timmermans |
| 2009/0200965 A1 | 8/2009 | King |
| 2010/0033095 A1 | 2/2010 | Sadwick |
| 2010/0289418 A1 | 11/2010 | Langovsky |
| 2010/0315001 A1 | 12/2010 | Ostby |
| 2010/0320922 A1 | 12/2010 | Palazzolo |
| 2010/0320931 A1 | 12/2010 | Radermacher |
| 2011/0260634 A1 | 10/2011 | Zhang |
| 2013/0234596 A1 * | 9/2013 | Hollander .......... H05B 33/0809 315/90 |
| 2013/0320869 A1 * | 12/2013 | Jans .................... H05B 33/0803 315/186 |
| 2014/0203716 A1 * | 7/2014 | Tao .................... H05B 33/0803 315/186 |

* cited by examiner

ADAPTATION CIRCUIT FOR COUPLING LED TO BALLAST

CROSS-REFERENCE TO PRIOR APPLICATIONS

This application is the U.S. National Phase application under 35 U.S.C. §371 of International Application No. PCT/IB2013/052189, filed on Mar. 20, 2013, which claims the benefit of U.S. Patent Application No. 61/617108, filed on Mar. 29, 2012. These applications are hereby incorporated by reference herein.

FIELD OF THE INVENTION

The invention relates to an adaptation circuit for coupling a light circuit to a ballast circuit. The invention further relates to devices and methods.

Examples of such a light circuit are circuits with one or more light emitting diodes of whatever kind and in whatever combination. Examples of such a device are lamps and parts thereof.

BACKGROUND OF THE INVENTION

US 2002/0060526 A1 discloses a light tube and a power supply circuit. This power supply circuit comprises a serial connection of conventional fluorescent ballast, a rectifier/filter, a pulse-width-modulation switch and a current limiter to be coupled to a light emitting diode array.

Usually, power is delivered from a ballast circuit to a load by providing a certain voltage signal or current signal while the load represents a certain load impedance. The waveform of the voltage signal as supplied to the load is, to a large extent, determined by a waveform of the voltage signal actively outputted by the ballast circuit.

SUMMARY OF THE INVENTION

It is an object of the invention to provide an improved adaptation circuit for coupling a light circuit to a ballast circuit. Further objects of the invention are to provide devices and methods.

According to a first aspect, an adaptation circuit for coupling a light circuit to a ballast circuit is provided, the light circuit comprising at least one light emitting diode, the ballast circuit being designed for connection to a discharge lamp using a first amount of power, the light circuit being designed to use a second amount of power equal to or different from the first amount of power, the adaptation circuit comprising a conversion circuit for converting an input voltage signal and an input current signal coming from the ballast circuit into an output voltage signal and an output current signal destined for the light circuit, the conversion circuit being adapted to
  drain energy from the ballast circuit, and
  reduce an amplitude of the input voltage signal to a value below a predefined value during a predefined time interval after the energy from the ballast circuit has been transferred to the conversion circuit, the time interval being synchronized with at least one period of the input voltage signal.

By introducing the conversion circuit into the adaptation circuit, a third state, between a first draining state and a second releasing state, has become possible. The third state allows relevant values as experienced by the ballast circuit to remain comparable to a situation when the discharge lamp was powered. As a result, protection and monitoring methods in the ballast circuit will keep on performing well, and components in and near the ballast circuit are not stressed more than usual. This third state allows the conventional fluorescent ballast to be kept as it is, even in case the second amount of power used by the light circuit is different from (such as for example much smaller than) the first amount of power used by the discharge lamp. As a result, the conventional fluorescent ballast does not need to be replaced and is not stressed more than usual, which are great advantages.

An embodiment of the adaptation circuit is defined by the conversion circuit further being adapted to
  hold the energy during a reduction of the amplitude of the input voltage signal to the value or another value below the predefined value, and
  release the energy.

The third state situated between the first draining state and the second releasing state is preferably a holding state for holding the energy. The states adapt a waveform of the output voltage signal as supplied to the light circuit and reduce an influence of the ballast circuit on this waveform.

An embodiment of the adaptation circuit is defined by the conversion circuit comprising at least a reactive element for storing the energy, a switch for, in combination with the reactive element, reducing the amplitude of the input voltage signal to the value below the predefined value during the predefined time-interval, and a timer circuit for controlling the switch. The reactive element comprises for example an inductor.

An embodiment of the adaptation circuit is defined by the timer circuit being an adjustable timer circuit for adjusting the control of the switch in dependence on the second amount of power. Different second amounts of power may require different controls of the switch.

An embodiment of the adaptation circuit is defined by the conversion circuit further comprising a capacitor, the reactive element comprising an inductor, one side of the inductor being coupled to a first input terminal of the conversion circuit, another side of the inductor being coupled to one side of the diode, another side of the diode being coupled to one side of the capacitor, another side of the capacitor being coupled to a second input terminal of the conversion circuit, both sides of the capacitor being coupled to output terminals of the conversion circuit, and main contacts of the switch being coupled to said one side of the diode and to said other side of the capacitor. The capacitor for example has a filtering function.

An embodiment of the adaptation circuit is defined by the conversion circuit further comprising a trigger circuit for triggering the timer circuit. Preferably, the timer circuit is triggered via a trigger circuit that forms part of the conversion circuit.

An embodiment of the adaptation circuit is defined by the trigger circuit being adapted to deactivate an operation of the switch upon start-up and/or until a certain time-interval has passed and/or until a certain state has been reached. The expiration of the certain time-interval and the reaching of the certain state may be used to neutralize start-up problems.

An embodiment of the adaptation circuit is defined by the trigger circuit comprising:
  a definition circuit for defining a time parameter and/or a voltage level, and
  a decision circuit coupled to the definition circuit for providing a trigger signal to the timer circuit.

Said definitions of the time parameter and the voltage level may define a start of the third state.

An embodiment of the adaptation circuit is defined by the definition circuit comprising a serial circuit of one or more resistors, one or more voltage defining circuits and a capacitor, the capacitor possibly being coupled in parallel to a further resistor, the definition circuit being coupled in parallel to the conversion circuit, and the decision circuit comprising a transistor with a control electrode coupled to an interconnection in the definition circuit and with a main electrode for providing the trigger signal.

An embodiment of the adaptation circuit is defined by the trigger circuit further comprising
a switch for bridging at least a part of the definition circuit to deactivate a reduction of the amplitude of the input voltage signal to the value below the predefined value upon start-up and/or until a certain time-interval has passed and/or until a certain state has been reached.

Again, the expiration of the certain time-interval and the reaching of the certain state may be used to neutralize start-up problems.

An embodiment of the adaptation circuit is defined by the conversion circuit comprising a rectification circuit for connection to the ballast circuit.

According to a second aspect, a device is provided comprising the adaptation circuit as defined before and further comprising the ballast circuit.

According to a third aspect, a device is provided comprising the adaptation circuit as defined before and further comprising the light circuit.

According to a fourth aspect, a method is provided for coupling a light circuit to a ballast circuit, the light circuit comprising at least one light emitting diode, the ballast circuit being designed for connection to a discharge lamp using a first amount of power, the light circuit being designed to use a second amount of power equal to or different from the first amount of power, the method comprising a conversion of an input voltage signal and an input current signal coming from the ballast circuit into an output voltage signal and an output current signal destined for the light circuit, the conversion comprising
draining energy from the ballast circuit, and
reducing an amplitude of the input voltage signal to a value below a predefined value during a predefined time-interval after the energy from the ballast circuit has been transferred to the conversion circuit, the predefined time interval being synchronized with at least one period of the input voltage signal.

According to a fifth aspect, a method is provided for replacing a discharge lamp using a first amount of power by a light circuit using a second amount of power equal to or different from the first amount of power, the light circuit comprising at least one light emitting diode, the method comprising a step of installing an adaptation circuit as defined above for coupling the light circuit to a ballast circuit, the ballast circuit being designed for being coupled to the discharge lamp.

An insight could be that an input waveform can be altered by draining an energy storage in a ballast circuit, that power can be received from the ballast circuit by draining an energy storage in that ballast circuit, and/or that the first draining state and the second releasing state do not necessarily need to follow each other directly.

A basic idea could be that an input stage of an adaptation circuit is to be designed to drain energy from the ballast circuit during a relatively short time, that the input stage of the adaptation circuit is to be designed to hold an input voltage signal in a certain range for a period after the energy has been drained, and/or that between the first draining state and the second releasing state a third state, such as a holding state, is to be introduced.

Problems to provide an improved adaptation circuit and devices and methods have been solved.

Advantages are that conventional fluorescent ballasts do not need to be replaced and are not stressed more than usual, even in case the second amount of power used by the light circuit is different from the first amount of power used by the discharge lamp.

These and other aspects of the invention will be apparent from and elucidated with reference to the embodiments described hereinafter.

DETAILED DESCRIPTION OF EMBODIMENTS

For retrofitting discharge lamps such as fluorescent tubes, light circuits comprising light emitting diodes are to be integrated into tube-like housings designed to replace fluorescent tubes. Often, ballast circuits designed to be used in combination with those fluorescent tubes cannot be replaced easily and are to be kept as they are. Especially when operating such light circuits at different power levels compared to the power levels of the discharge lamps (preferably at reduced power levels lower than original power levels of the discharge lamps), the characteristics of the ballast circuits should not be ignored, such as saturation levels of resonant inductors in the ballast circuits and various protection and monitoring methods in some of the ballast control chips.

Said reduced power levels can be realized by selecting proper operating voltages for the light circuits that for example comprise light emitting diode strings. This way, the power levels are reduced, but the performances of the ballast circuits are also affected. This might cause overheating or saturation of magnetic components in the ballast circuits. Further, some ballast circuits are equipped with control chips that monitor currents entering resonant tanks of the ballast circuits. Said reductions of the power levels should not cause error detections and shutdowns of the ballast circuits.

The adaptation circuit discussed below allows the power levels of the light circuits to be lower than original power levels of the discharge lamps while keeping the ballast circuits as they are, working and performing well.

Figure 1:
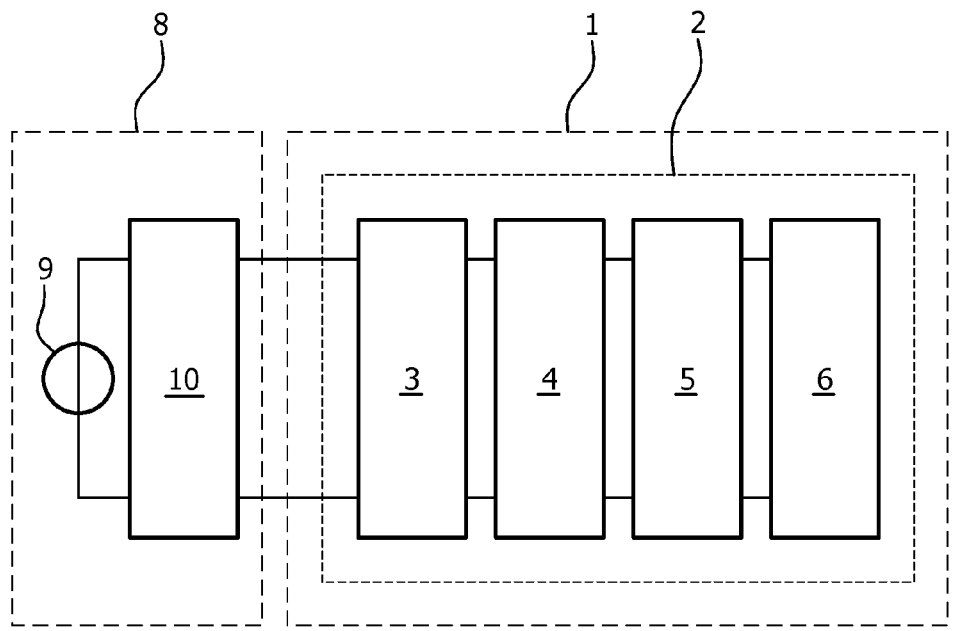
FIG. 1 shows an embodiment of an adaptation circuit.

In FIG. 1, an adaptation circuit 1 is shown comprising a conversion circuit 2. The adaptation circuit 1 is coupled to a ballast circuit 8 that comprises a source 9, such as for example a half bridge converter, and a resonant tank 10. The conversion circuit 2 comprises for example a rectification circuit 3, a switching circuit 4, a trigger circuit 5 and a timer circuit 6.

Figure 2:
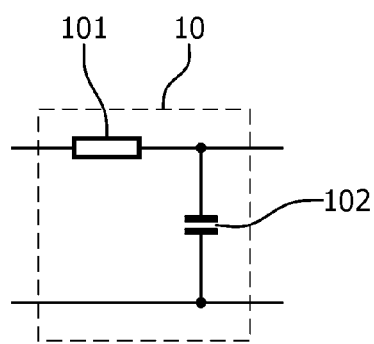
FIG. 2 shows an embodiment of a resonant tank of a ballast circuit.

In FIG. 2, a resonant tank 10 of a ballast circuit 8 is shown in greater detail, comprising an inductor 101 and a capacitor 102. The inductor 101 is coupled between an input terminal (left) and an output terminal (right) of the ballast circuit 8. The capacitor 102 is coupled in parallel to the output terminals (right) of the ballast circuit 8. Other kinds of ballast circuits are not to be excluded, i.e. types having additional output terminals for feeding so-called filaments.

Figure 3:
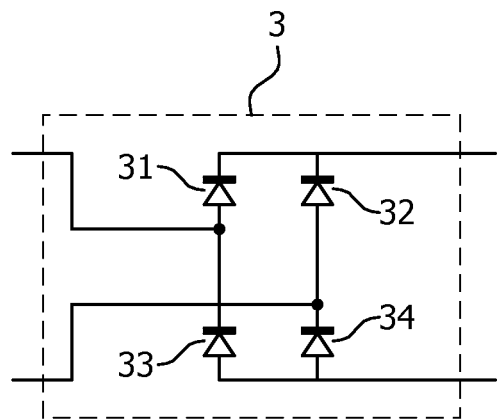
FIG. 3 shows an embodiment of a rectification circuit.

In FIG. 3, a rectification circuit 3 is shown in greater detail, comprising four diodes 31-34 in a so-called diode bridge. Other kinds of rectification circuits are not to be excluded, i.e. types having additional input terminals, emulating the function of the so-called filaments of the discharge lamp.

Figure 4:
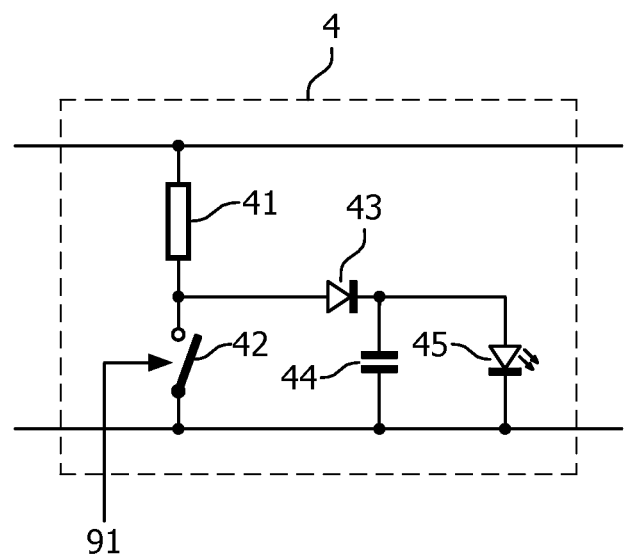
FIG. 4 shows an embodiment of a switching circuit.

In FIG. 4, a switching circuit 4 is shown in greater detail, comprising a first serial circuit of an inductor 41 and a switch 42 coupled to input terminals (left) of the switching circuit 4 and also coupled to output terminals (right) of the switching circuit 4, and further comprising a second serial circuit of a diode 43 and a capacitor 44 coupled in parallel to the switch 42. A light circuit 45 comprising at least one light emitting diode is coupled in parallel to the capacitor 44. The switch 42 can be any kind of switch and receives a control signal via an electrode 91 such that the switching circuit 4 and the ballast circuit 8 operate in a synchronized way. This switching circuit 4 is a so-called step-up converter or boost converter, but other kinds of switching circuits are not to be excluded. The light circuit 45 may alternatively be located outside the switching circuit 4 or outside the adaptation circuit 1.

Although represented here by only one light emitting diode, the light circuit 45 will typically comprise multiple light emitting diodes, typically in a serial connection. In addition, the light circuit 45 may further comprise a power distribution element, such as a switch, for distributing input energy to one or more parts of the light emitting diodes in a certain configuration, power conversion elements, such as a switch mode power supply, for adapting voltage and/or current levels, and energy storage elements, such as a capacitor, for buffering energy in order to provide reduced flicker levels or even stable light during intervals of low input power.

Figure 5:
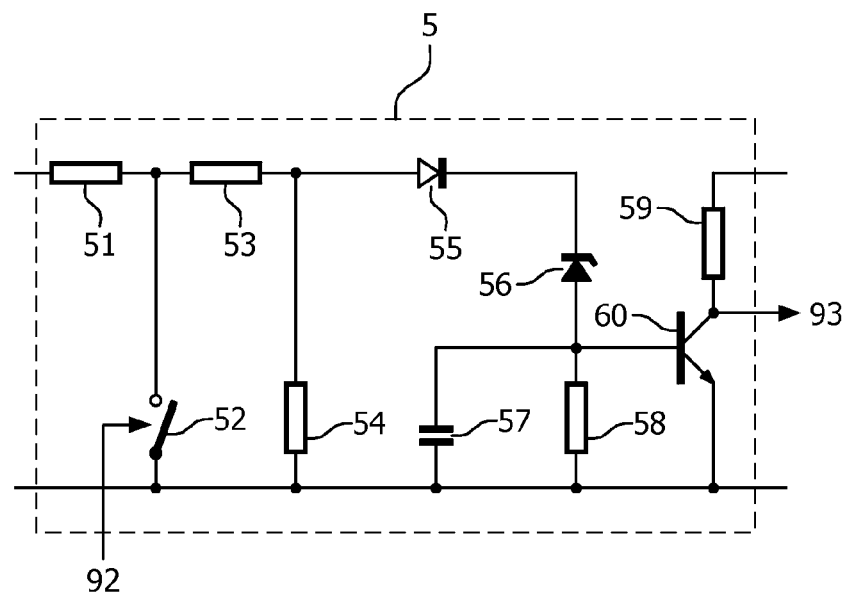
FIG. 5 shows an embodiment of a trigger circuit.

In FIG. 5, a trigger circuit 5 is shown in greater detail, comprising a first serial circuit of a resistor 51 and a switch 52 coupled to input terminals (left) of the trigger circuit 5, a second serial circuit of two resistors 53 and 54 coupled in parallel to the switch 52, a third serial circuit of a diode 55, a zener diode 56 and a parallel circuit of a capacitor 57 and a resistor 58, the third serial circuit being coupled in parallel to the resistor 54, and a transistor 60 having a control electrode and a first main electrode coupled to sides of the parallel circuit and having a second main electrode coupled to one side of a resistor 59. Another side of the resistor 59 and the first main electrode form output terminals of the trigger circuit 5 and the second main electrode forms an electrode 93 for providing a trigger signal to the timing circuit 6. The switch 52 can be any kind of switch and receives a control signal via an electrode 92. Other kinds of trigger circuits are not to be excluded, i.e. circuits where the triggering depends on a power level. As an example, the real power or the power delivered to the light circuit 45 could be measured and compared to a respective desired value. Depending on the result of the comparison, a trigger level is adapted.

Figure 6:
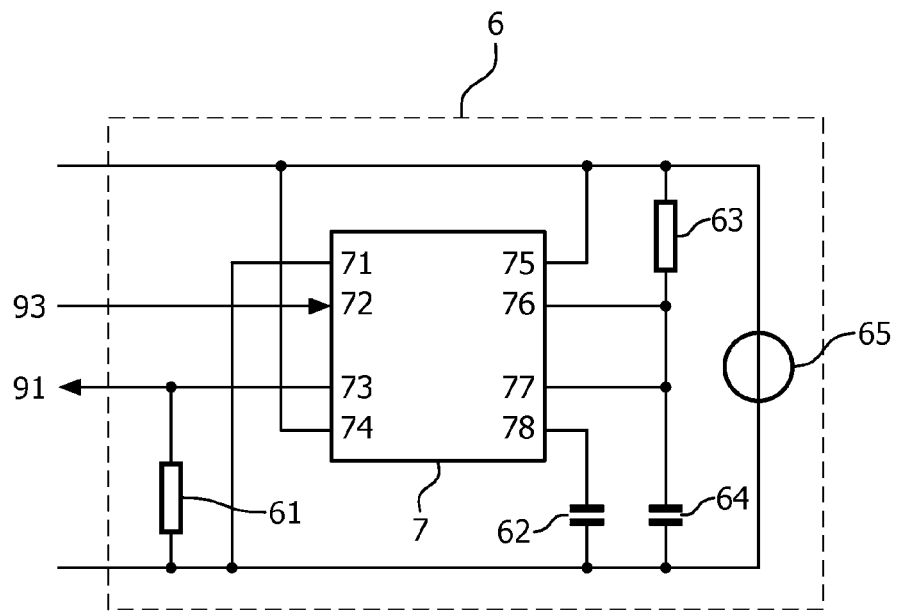
FIG. 6 shows an embodiment of a timer circuit.

In FIG. 6, a timer circuit 6 is shown in greater detail, comprising a direct current voltage source 65 coupled to a positive terminal (above) and a negative or ground terminal (below) of the timer circuit 6. This direct current voltage source 65 may for example be realized via the light circuit 45 (e.g. by tapping a voltage potential within a string of light emitting diodes) or otherwise. The timer circuit 6 further comprises an integrated circuit 7 having eight terminals 71-78, such as a 555 timer chip. The terminal 71 is coupled to the negative or ground terminal (below) of the timer circuit 6. The terminal 72 receives the trigger signal via the electrode 93. The terminal 73 provides the control signal via the electrode 91 and is coupled via a resistor 61 to the negative or ground terminal (below) of the timer circuit 6. The terminals 74 and 75 are coupled to the positive terminal (above) of the timer circuit 6. The terminals 76 and 77 are coupled via a resistor 63 to the positive terminal (above) of the timer circuit 6 and are coupled via a capacitor 64 to the negative or ground terminal (below) of the timer circuit 6. The terminal 78 is coupled via a capacitor 62 to the negative or ground terminal (below) of the timer circuit 6. Other kinds of timer circuits are not to be excluded, i.e. circuits where the timing depends on a power level. As an example, the real power or the power delivered to the light circuit 45 could be measured and compared to a respective desired value. Depending on a result of the comparison, a duration of a period is adapted.

Figure 7:
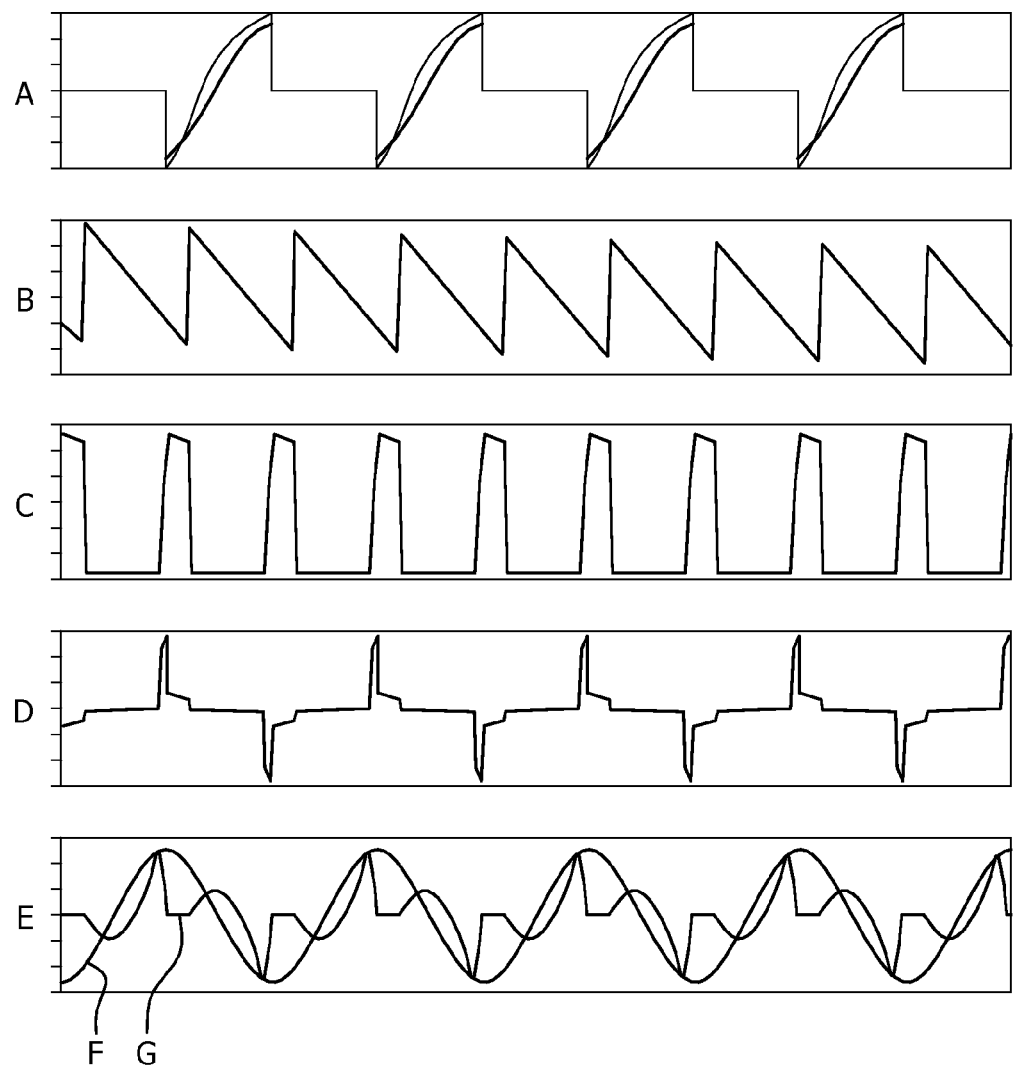
FIG. 7 shows waveforms.

In FIG. 7, waveforms are shown, wherein waveform A is a voltage signal sensed by an integrated circuit in the ballast circuit (discharge lamp: lighter-colored graph; adaptation circuit 1 and light circuit 45 with light emitting diodes: darker-colored graph), waveform B is a current signal through the lamp (light circuit 45 with light emitting diodes), waveform C is a current signal through the inductor 41, waveform D is a current signal entering the rectification circuit 3, and waveform E is a voltage signal at an input of the rectification circuit 3 (discharge lamp: graph F; light circuit 45 with light emitting diodes: graph G).

Using this adaptation circuit 1, a power level can be reduced, e.g. from a normal 32 W down to about 10 W. This enables huge power saving and (remote control) dimmable light circuits. The special timing for the switching circuit 4 results in the relevant values as experienced by the ballast circuit 8 remaining comparable to the situation when the fluorescent normal tube was powered. As a result, protection and monitoring methods in the ballast circuits 8 will not stop the operation of the light circuit 45, and components in the ballast circuit 8 are not stressed any more than usual.

The synchronization between the ballast circuit 8 and the switching circuit 4 and the correct positioning (with respect to time) of a pulse of the control signal is done here via voltage measurement. The timer circuit 6 sets a short circuit duration as realized via the switch 42 in the switching circuit 4.

In the trigger circuit 5, a received voltage signal is measured and a trigger signal is derived from this measured voltage signal. When the rectified voltage signal is for example higher than approximately 130V, the transistor 60 triggers the timer circuit 6. The timer circuit 6 is based on a 555 timer chip, which is a low-cost, worldwide-available component. The resistor 63 and the capacitor 64 set the duration of the time period during which the switch 42 is closed.

The switch 52 is used to block any (false) trigger signal in the first 20 µs, which represents some kind of controlled start-up behavior. During start-up, both the ballast circuit 8 and the light circuit 45 have to stabilize their operation until a stable operation point has been reached. With respect to the light circuit 45 and the capacitor 44, a larger amount of energy has to be charged. This charging should occur as fast as possible in order to provide light as soon as possible. Therefore, the shunting action of the switching circuit 4 (which is intended to reduce the power level) is to be de-activated at the beginning of a certain period of time. This may be a predetermined period of time, generated via a fixed time delay. During startup, the switch 52 is brought into a conductive state, shunting the measurement voltage to zero, and hence preventing any trigger signal from being supplied to the timer circuit 6. Different embodiments are possible of course. The trigger signals may be blocked until a certain voltage at the light circuit 45 or the capacitor 44 has been reached. Or the trigger signals may be unaffected, but the control signals to the switch 42 may be blocked. Further alternatively, the duration of the shorting interval in the switching circuit 4 may be reduced or prolonged in order to have a fast and stable startup procedure. In normal, steady state operation, the switch 52 will be in a non-conductive state, such that the trigger signals can be supplied.

In respect of the waveforms shown in FIG. 7, the waveform C is the current signal through the inductor 41 that represents an approximation to a desired pulsed current. When an input voltage signal coming from the ballast circuit 8 reaches a trigger level, the switch 42 is brought into a conductive state and the current signal flowing through the inductor 41 is ramped up, at a rate determined by this input voltage signal and the inductor 41. In turn, the input voltage signal is not a fixed voltage signal but originates from the discharging of the capacitor 102. So, during the ramp up of the current signal, the energy storage in the ballast 8 (the capacitor 102 in the FIG. 2) is drained. Since the capacitor 102 receives its energy via the inductor 101, that limits the rate of change of the current signal, the inductor 101 isolates the draining event from the rest of the ballast 8. Hence, the capacitor 102 can be drained quickly without resulting in an excessive current flow in the inductor 101. When the input voltage signal has decreased to zero, the current through the inductor 41 continues to flow, thereby short-circuiting the diode bridge. The current signal then is only the current signal delivered by the inductor 101. After about 3 µs, the switch 42 is brought into a non-conductive state and the current signal can charge the (filter) capacitor 44 and power the light circuit 45. The duration (here: 3 µs) of the hold interval is determined by the timer circuit 6 and may be altered in order to control the power delivered. The waveform E shows that a voltage signal across the light circuit 45 is quite different from a voltage signal across a fluorescent lamp. But normally, a control chip in the ballast circuit 8 does not monitor a shape of such a voltage signal; only the peak level is measured and compared with a "lamp ignition failure" threshold at about 300V. So, the light circuit 45 will not trigger a protection step performed in the control chip. Finally, the waveform A shows that the shape and the amplitude of the signals sensed by an integrated circuit in the ballast circuit 8 for the light circuit 45 and the conventional fluorescent lamp are quite similar. The important feature here is that the positive peak value is not higher than for the conventional fluorescent lamp, because this would trigger a (capacitive mode) protection in the ballast control chip. As this peak value is lower, the current signal (both root mean square and peak value) in the inductor 101 is also lower than in the case of the conventional fluorescent lamp, thereby preventing any unwanted saturation in this component.

Summarizing, adaptation circuits 1 allow discharge lamps to be replaced by light circuits 45 with light emitting diodes, while keeping ballast circuits 8 designed for connection to the discharge lamps. The adaptation circuits 1 comprise conversion circuits 2 for converting input voltage and current signals coming from the ballast circuits 8 into output voltage and current signals destined for the light circuits 45. The conversion circuits 2 reduce amplitudes of the input voltage signals to values below predefined values during predefined time intervals after energy from the ballast circuits 8 has been transferred to the conversion circuits 2. The time intervals are synchronized with periods of the input voltage signals. Between first draining states for draining energy and second releasing states for releasing the energy, third states such as holding states for holding the energy have been introduced. The third states allow relevant values as experienced by the ballast circuits 8 to remain comparable to situations when the discharge lamps were powered.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A device including an adaptation circuit for coupling a light circuit to a ballast circuit, the light circuit comprising at least one light emitting diode, the ballast circuit arranged for connection to a discharge lamp using a first amount of power, the light circuit being designed to use a second amount of power, the adaptation circuit comprising a conversion circuit for converting a periodic input voltage signal and an input current signal coming from the ballast circuit into an output voltage signal and an output current signal for the light circuit, wherein the conversion circuit is configured to:
   drain energy from the ballast circuit during a portion of a period of the input voltage signal,
   reduce an amplitude of the input voltage signal to a value below a predefined value, and store the drained energy, during a predefined time interval of the period of the input voltage signal after the portion of the period of the input voltage signal wherein the energy from the ballast circuit has been drained by the conversion circuit, the predefined time interval being synchronized with the period of the input voltage signal, and
   release the stored energy to the light circuit during another portion of the period after the predefined time interval elapses.

2. The device of claim 1, wherein the conversion circuit is further configured to:
   hold the energy during a reduction of the amplitude of the input voltage signal to the value or another value below the predefined value, and
   release the held energy within the period of the input voltage signal.

3. The device of claim 1, wherein the conversion circuit comprises:
   a reactive element for storing the energy,
   a switch for, in combination with the reactive element, reducing the amplitude of the input voltage signal to the value below the predefined value during the predefined time interval, and
   a timer circuit for controlling the switch.

4. The device of claim 3, wherein the timer circuit comprises an adjustable timer circuit for adjusting the operation of the switch in dependence on the second amount of power.

5. The device of claim 3, wherein the reactive element comprises an inductor, and wherein the conversion circuit further comprises:
a capacitor; and
a diode,
wherein a first terminal of the inductor is coupled to a first input terminal of the conversion circuit,
wherein a second terminal of the inductor is coupled to a first terminal of the diode,
wherein a second terminal of the diode is coupled to a first terminal of the capacitor,
wherein a second terminal of the capacitor is coupled to a second input terminal of the conversion circuit,
wherein each terminal of the capacitor is coupled to a corresponding one of the output terminals of the conversion circuit, and
wherein a first contact of the switch is coupled to the first terminal of the diode and a second contact of the switch is coupled to the second terminal of the capacitor.

6. The device of claim 3, wherein the conversion circuit comprises a trigger circuit for triggering the timer circuit.

7. The device of claim 6, wherein the trigger circuit is adapted to deactivate the switch upon start-up.

8. The device of claim 6, wherein the trigger circuit comprises:
a definition circuit for defining a time parameter and/or a voltage level, and
a decision circuit coupled to the definition circuit, wherein the decision circuit is configured to provide a trigger signal to the timer circuit.

9. The device of claim 8, wherein the definition circuit comprises:
a serial circuit of one or more first resistors, one or more voltage defining circuits, and a capacitor,
wherein the capacitor is coupled in parallel to a second resistor, and
wherein the decision circuit comprises a transistor, the transistor having a control electrode coupled to the definition circuit, and a main electrode providing the trigger signal.

10. The device of claim 9, the trigger circuit further comprising a switch bridging at least a part of the definition circuit arranged to deactivate a reduction of the amplitude of the input voltage signal to the value below the predefined value upon start-up of the adaptation circuit.

11. The device of claim 9, the trigger circuit further comprising a switch bridging at least a part of the definition circuit arranged to deactivate a reduction of the amplitude of the input voltage signal to the value below the predefined value until a certain time interval has passed.

12. The device of claim 9, the trigger circuit further comprising a switch bridging at least a part of the definition circuit arranged to deactivate a reduction of the amplitude of the input voltage signal to the value below the predefined value when a certain state has been reached.

13. The device of claim 6, wherein the trigger circuit is adapted to deactivate the switch when a certain time interval has passed.

14. The device of claim 6, wherein the trigger circuit is configured to deactivate the switch when a certain state has been reached.

15. The device of claim 1, wherein the conversion circuit comprises a rectification circuit connected to the ballast circuit.

16. The device of claim 1, wherein the second amount of power is different than the first amount of power.

17. A method of coupling a light circuit to a ballast circuit, wherein the light circuit comprises at least one light emitting diode, the ballast circuit is arranged to connect to a discharge lamp using a first amount of power, and the light circuit is arranged to use a second amount of power, the method comprising:
converting a periodic input voltage signal and an input current signal coming from the ballast circuit into an output voltage signal and an output current signal for the light circuit, the conversion comprising,
draining energy from the ballast circuit during a portion of a period of the input voltage signal,
reducing an amplitude of the input voltage signal to a value below a predefined value, and storing the drained energy, during a predefined time interval of the period of the input voltage signal after the portion of the period of the input voltage signal wherein the energy from the ballast circuit has been transferred to the conversion circuit, and
releasing the stored energy to the light circuit during another portion of the period after the predefined time interval elapses,
wherein the predefined time interval is synchronized with the period of the input voltage signal.

18. A device for supplying power from a ballast circuit, which is configured to be connected to a discharge lamp and supply a first amount of power, to a light circuit having at least one light emitting diode and which is configured to use a second amount of power, the device comprising:
a rectifier having an input configured to be connected to the ballast circuit and to receive therefrom an input voltage signal and an input current signal, and having an output configured to supply a rectified voltage;
a trigger circuit having an input connected to output of the rectifier, and having an output configured to supply a trigger signal which is synchronized to a period of the input voltage signal;
a timer circuit configured to receive the trigger signal and in response thereto to generate a control signal having a pulse period set by the timer circuit; and
a switching circuit having an input connected to an output of the rectifier, and having an output configured to supply an output voltage signal and an output current signal to the light circuit, the switching circuit comprising a switch connected to receive the control signal, wherein the switch is configured to respond to the control signal to cause the device to:
drain energy from the ballast circuit during a portion of a period of the input voltage signal,
reduce an amplitude of the input voltage signal to a value below a predefined value, and store the drained energy, during a predefined time interval of the period of the input voltage signal after the portion of the period of the input voltage signal wherein the energy from the ballast circuit has been drained by the conversion circuit, the predefined time interval being defined by the pulse period of the control signal and being synchronized with the period of the input voltage signal, and release the stored energy to the light circuit during another portion of the period after the predefined time interval elapses.

\* \* \* \* \*